United States Patent [19]

Rozenberg et al.

[11] 4,388,108

[45] Jun. 14, 1983

[54] METHOD AND APPARATUS FOR SMELTING CHARGE MATERIALS IN ELECTRIC ARC FURNACE

[76] Inventors: Vladimir L. Rozenberg, ulitsa Novolesnaya, 18, korpus, 1, kv. 148; Igor P. Brukovsky, 1 Mosfilmovsky pereulok, 5, korpus 2b, kv. 16, both of Moscow; Sergei M. Nekhamin, ulitsa Chekhova, 11, kv. 32, Pushkino Moskovskoi oblasti; Mark A. Ryss, ulitsa Rossiiskaya, 32, kv. 7., Chelyabinsk; Boris B. Pelts, ulitsa Lesnaya, 62/13, kv. 157, Moscow; German V. Serov, Shipilovskaya ulitsa 38, korpus 1, kv. 188, Moscow; Alexandr N. Popov, ulitsa Akademika Pavlova, 13, korpus 4, kv. 58, Moscow; Gennady D. Bogoljubov, Perovskoe, 10, kv. 16, Moscow; Leonid A. Ryazantsev, 3 Karacharovskaya ulitsa, 8, korpus 1, kv. 21, Moscow; Jury S. Ioffe, Yaroslavskaya ulitsa, 1/9, kv. 11, Moscow; Grigory B. Fridman, ulitsa Entuziastov, 7, kv. 45, Zaporozhie; Leonid I. Boitsov, prospekt Lenina, 149, kv. 29, Zaporozhie; Petr D. Andrienko, ulitsa Novgorodskaya, 5, kv. 96, Zaporozhie; German V. Kovalev, ulitsa Tennisnaya, 3, kv. 12, Zaporozhie; Sergei A. Sankov, ulitsa Vestofonskaya, 18, kv. 1, Zaporozhie; Vladimir V. Fomenko, ulitsa Chervono Kinota, 24, Zaporozhie; Valery I. Stalev, ulitsa Girshmana, 18, kv. 21, Kharkov; Pavel K. Greditor, prospekt Lenina, 129, kv. 31, Zaporozhie; Stanislav V. Petrov, ulitsa Gyardeitsev Shirapentsev, 63, kv. 44, Kharkov; Vladimir G. Mashyanov, ulitsa Voroshilova, 31, kv. 116, Zaporozhie, all of U.S.S.R.

[21] Appl. No.: 339,651

[22] Filed: Jan. 15, 1982

Related U.S. Application Data

[63] Continuation of Ser. No. 186,244, Sep. 11, 1980.

[51] Int. Cl.$^3$ .................. H05B 7/18; C22B 4/00
[52] U.S. Cl. ..................................... 75/10 R; 373/102
[58] Field of Search ..................................... 75/10–12; 13/9 R

[56] References Cited

U.S. PATENT DOCUMENTS

3,767,831 10/1973 Plockinger ......................... 75/10 R
3,867,130 2/1975 Paton ............................... 75/10 R

*Primary Examiner*—P. D. Rosenberg
*Attorney, Agent, or Firm*—Fleit, Jacobson & Cohn

[57] ABSTRACT

A method for smelting charge materials in an electric arc furnace consists in that a bath of the electric arc furnace is loaded with the charge materials, electrodes of the electric arc furnace are supplied with an alternating current, the charge materials are melted, redox reactions are conducted and a finished melt and a slag are tapped, the alternating current of industrial frequency supplied to the electrodes of the electric arc furnace being first converted to one of a frequency ranging between 0.05 and 30 Hz. An apparatus for carrying into effect the above method comprises an electric arc furnace, in a bath of which are inserted electrodes. A secondary winding of a transformer is coupled with the electrodes through power supply arrangements. Between the electrodes and the transformer and in-between sections of the power supply arrangements is placed a frequency converter, control inputs of which are connected to outputs of a frequency converter control unit having inputs coupled with the power supply arrangements on the side of the electrodes of the electric arc furnace. The apparatus also comprises a unit for controlling the power input to the electric arc furnace, connected to the power supply arrangements on the side of the electrodes and intended for generating a signal energizing an electrode positioning mechanism.

4 Claims, 14 Drawing Figures

METHOD AND APPARATUS FOR SMELTING CHARGE MATERIALS IN ELECTRIC ARC FURNACE

This is a continuation of application Ser. No. 186,244, filed Sept. 11, 1980.

BACKGROUND OF THE INVENTION

1. Field of the Invention

The invention relates to electrometallurgy, and more particularly to methods and apparatus for smelting charge materials in electric arc furnaces.

The invention can find application in iron and steel production, nonferrous metallurgy, the chemical industry and the manufacture of refractories.

2. Description of the Prior Art

There is known a method for smelting charge (see F. P. Edneral "Elektrometallurgiya stali i ferrosplavov" /Electrometallurgy of steel and ferroalloys/, "Metallurgiya" Publishers, Moscow, 1977, pp. 103–157, pp. 378–454) in an ore-smelting or arc steelmaking furnace supplied with industrial frequency (f=50 Hz) alternating current, comprising loading a charge, melting it, conducting redox reactions and tapping a finished melt. Also known is an electric furnace plant for putting the above method into effect (L. E. Nikol'skii et al. "Promyshlennye ustanovki elektrodugovogo nagreva i ikh parametry" /Industrial plants for electric arc heating and their parameters/, "Energiya" Publishers, Moscow, 1971, pp. 16–26, pp. 94–109), which consists of a transformer coupled by the power supply arrangements with electrodes inserted into a bath of the electric arc furnace, mechanisms for positioning and slipping electrodes, and systems for automatically feeding the charge materials and adjusting the electric power input.

However, the above method involves excessive losses of energy as it provides no means for continuously adjusting the voltage and the position of the electrodes. The apparatus has a low natural power factor due to large reactance losses, with the reactive power amounting to 50–60% of the total power. The greater the energy losses are, the larger the electric furnace power rating is. The compensation of the reactive power necessitates additional equipment. In addition, the apparatus above suffers from high losses of active energy in the power supply arrangements because of the skin and the proximity effects, thus requiring much copper for conductors.

During smelting, it is necessary to re-position the electrodes of the electric arc furnace continually so as to adjust the power input thereto, this disturbing the thermal equilibrium in the bath of the electric arc furnace.

The above apparatus has large inherent electromagnetic losses in component metallic structures, the mechanical resistance of structural elements from magnetic materials dropping because they overheat.

Another disadvantage is a transfer of power between the phases, which causes irregularities in the distribution of energy in the electric arc furnace and results in lower both throughput capacity of the furnace and durability of refractory lining of the furnace. Due to the skin effect, the cross section of the supply conductors is utilized inefficiently, thus requiring greater both mass and dimensions of the power supply arrangements.

Yet another method for smelting a charge in a 21,000-kVA electric arc furnace (see "Spravochnik po elektrotermicheskomu oborudovaniyu" /Electrothermal equipment handbook/, "Energiya" Publishers, Moscow, 1971, Chapter 9) consists in a continuous loading of the charge (coke, quartzite and iron chips) into a bath of the electric arc furnace supplied with industrial-frequency alternating current. In the bath of the electric arc furnace, the thermal energy is released in the form of the Joule heat by the alternating current flowing through the charge and of heat radiated by the submerged arcing of the electrodes. The continuously evolving thermal energy heats the charge and melts it near the bottom of the bath. Melting proceeds along with the endothermal reduction of iron and silicon oxides by coke carbon which oxidizes to a gas and is removed from the electric arc furnace in the form of carbon monoxide and dioxide.

The reduced silicon dissolves in molten reduce iron, and a final melt trickles into the bath, wherefrom it is tapped into a ladle in the form of a ferrosilicon alloy and a small amount of slag.

An apparatus for putting this method for smelting charge materials in an electric arc furnace (see "Spravochnik po elektrotermicheskomu oborudovaniyu" /Electrothermal equipment handbook/, 1971, Chapter 9) into effect comprises a transformer connected by a secondary winding thereof through power supply arrangements to electrodes of the electric arc furnace, inserted in a bath of the electric arc furnace. The power supply arrangements are coupled with a unit for controlling the power input to the electric arc furnace by means of an electrode positioning mechanism coupled with the output of the unit for controlling the power input to the electric arc furnace.

Inherent in the above apparatus are excessive heat-losses caused by cooling water supplied inside chambers of structural elements from magnetic materials and by a large electromagnetic field permeating the space occupied by the furnace. These may amount to as much as 6–7% of the active power of the furnace. The high current intensity as compared to the voltage and the considerable reactance of the furnace circuit make it impossible to obtain an average monthly power factor above 0.80–0.82, this involving a high specific electric power consumption.

The copper power supply arrangements have a large cross section—21,600 mm$^2$—because of the inefficient utilization thereof.

It proves impossible to adjust smoothly the working voltage during smelting according to the above method because both the characteristics of the transformer and the electric service conditions of the apparatus are inappropriate with the effect that the electrodes have to be moved through as much as 1000 mm due to fluctuations in the electric resistance of the bath and the large voltage values of the transformer taps.

SUMMARY OF THE INVENTION

It is therefore an object of the invention to provide a method and an apparatus for smelting charges in electric furnaces which would raise the power factor of the electric furnace and the electric efficiency thereof, lower electromagnetic losses, and substantially reduce the necessary working travel of the electrodes of the electric arc furnace.

Another object of the invention is to provide a method and an apparatus for smelting charges in an electric furnace which would make it possible to smoothly adjust the voltage applied across the electrodes of the electric arc furnace by introducing a special-purpose frequency converter into the circuit of the apparatus.

Yet another object of the invention is to provide a method for smelting charges in an electric furnace which would avoid an uneven distribution of energy in the bath of the electric arc furnace by lowering the working frequency and by varying the ratio of the current intensities in the electrodes of the electric arc furnace.

The above and other objects are attained in a method for smelting charge materials in an electric arc furnace supplied with an alternating electric current, which comprises the loading of the charge materials, the melting thereof with attendant redox reactions, and the tapping of a finished melt and of a slag, wherein, according to the invention, the electric current is converted into one having a frequency of 0.05 to 30 HZz, and is then supplied to electrodes inserted into a bath of the electric arc furnace.

According to the invention, there is provided a method for smelting charge materials in an electric furnace supplied with an alternating electric current, which comprises the loading of the charge materials, their melting with attendant redox reactions, and the tapping of a finished melt and of a slag, wherein, according to the invention, the supply current is converted into a current having a frequency between 0.5 and 30 Hz, and is then supplied to the electrodes inserted into the bath of the electric arc furnace.

It is advisable to provide, in an apparatus for carrying into effect the method above, a transformer with secondary windings coupled through power supply arrangements with electrodes inserted into a bath of an electric furnace, a unit for controlling the power input to the electric arc furnace and connected to the power supply arrangements and coupled with the electrodes of the electric arc furnace through an electrode positioning mechanism according to the invention, a frequency converter inserted in between sections of the power supply arrangements and between the secondary winding of the transformer and the electrodes of the electric arc furnace, and a frequency converter control unit coupled with both the frequency converter and the power supply arrangements on the side of the electrodes through an electric transducer.

To minimize reactive losses in the frequency converter and the power supply conductors, it is preferable, according to the invention, to provide the frequency converter with a direct frequency conversion circuit from pairs of identical rectifier groups, of which each would have three arms of rectifiers installed in an opposing-parallel connection, the primary leads of the rectifier arms in each rectifier group being coupled with one of the phases of the power supply arrangements on the side of the transformer, the secondary leads of the arms of the rectifiers of one group being connected to a short-circuiting bus, the short-circuiting buses of the rectifier groups belonging to one pair and being isolated one from another and connected to one of the electrodes of the electric arc furnace, the section of the power supply arrangements on the side of the electrodes being formed with buses in a bifilar arrangement, with the leads of the frequency converter control unit being connected to the rectifiers of the frequency converter for alternately switching ON and OFF the forward and the reversed rectifiers with an adjustable interval between the ON and OFF operations.

It is useful in the apparatus, according to the invention, to have the frequency converter arranged in a direct frequency conversion circuit from pairs of identical rectifier groups, the rectifier groups in each pair being electrically connected one to another and to corresponding electrodes of the electric arc furnace, the short-circuiting buses of the rectifier groups being set in parallel to one another, and the secondary leads of the arms of the first, the second and the third phases of a single rectifier group being coaxial with the leads of the arms of the third, the second and the first phases, respectively, of another rectifier group of the same pair.

BRIEF DESCRIPTION OF THE DRAWINGS

These and other objects and features of the invention become readily apparent from one embodiment thereof which will now be described by way of example with reference to the accompanying drawings, in which:

FIGS. 5a–5k are diagrams illustrating instantaneous current intensities in various arms of rectifiers at various moments of time.

DESCRIPTION OF THE PREFERRED EMBODIMENT

Figure 1:
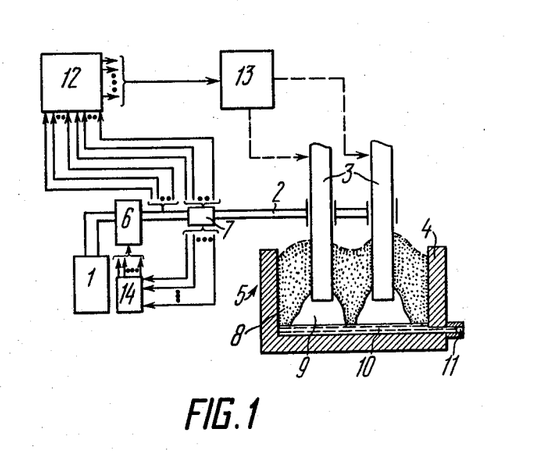
FIG. 1 is a block diagram of an apparatus for carrying into effect a method for smelting charge materials in an electric arc furnace, according to the invention.

FIG. 1 illustrates the block diagram of an apparatus for putting into effect the above method for smelting charge materials, comprising a transformer 1 intended for voltage and current transformations. A secondary winding (not shown on FIG. 1) of the transformer 1 is coupled through power supply arrangements 2 with electrodes 3 inserted in a bath 4 of an electric furnace 5, and a frequency converter 6 is inserted in between sections of the power supply arrangements 2. An electric transducer 7 is mounted on part of the power supply arrangements 2 on the side of the electrodes 3.

The power supply arrangements which are a component of the apparatus, consist of pipes, strips, flexible cables, wires and contacts intended to supply current from the transformer 1 via the frequency converter 6 to the electrodes 3. The frequency converter 6 is intended to convert the industrial-frequency current to one having a frequency between 0.05 and 30 Hz and to supply it to the electrodes 3. A bath 4 is designed for receiving charge materials 8, melting them by heating with Joule heat and radiation of an electric arc 9 and by conducting redox reactions with formation of a melt 10 removed from the bath 4 through a taphole 11.

The electric power input to the apparatus is controlled by means of a unit 12 for controlling the power input to the electric arc furnace and of an electrode positioning mechanism 13. A part of the inputs to the unit 12 for controlling the power input is coupled with the power supply arrangements 2 on the side of the output of the frequency converter 6 to monitor voltage fluctuations, whereas the other part of the inputs to the unit 12 is coupled with an electric transducer 7 set on the power supply conductors 2 in series with the electrodes 3 to monitor effective current intensities. The outputs of the unit 12 are connected to excitation windings of an electric drive (not shown on FIG. 1) of the electrode positioning mechanism 13. The circuits of the unit 12 for controlling the power input, of the electrode positioning mechanism 13 and of the electrical transducer 7 are designed in accordance with the known arrangements described, for example, in the book "Promyshlennye ustanovki elektrodugovogo nagreva iikh parametry"/Industrial electric arc heating plants and their parameters/, edited by L. E. Nikol'skii (Moscow, "Energiya" Publishers, 1971, pp. 100–109).

The apparatus on FIG. 1 also includes a unit 14 for controlling the frequency converter 6, the inputs of which are coupled with the power supply arrangements 2 through the electric transducer 7. The outputs of the unit 14 are coupled with the control inputs of the frequency converter 6 for controlling the frequency and the direction of the output current of the frequency converter 6. The circuit of the unit 14 for controlling the frequency converter 6 is a known arrangement described, for example, in the book by I. Ya. Bernshtein "Tiristornye preobrazovateli chastoty bez zvena postoyannogo toka"/Thyristor frequency converters without direct current network/, Moscow, "Energiya" Publishers, 1968, p. 75.

Figure 2:
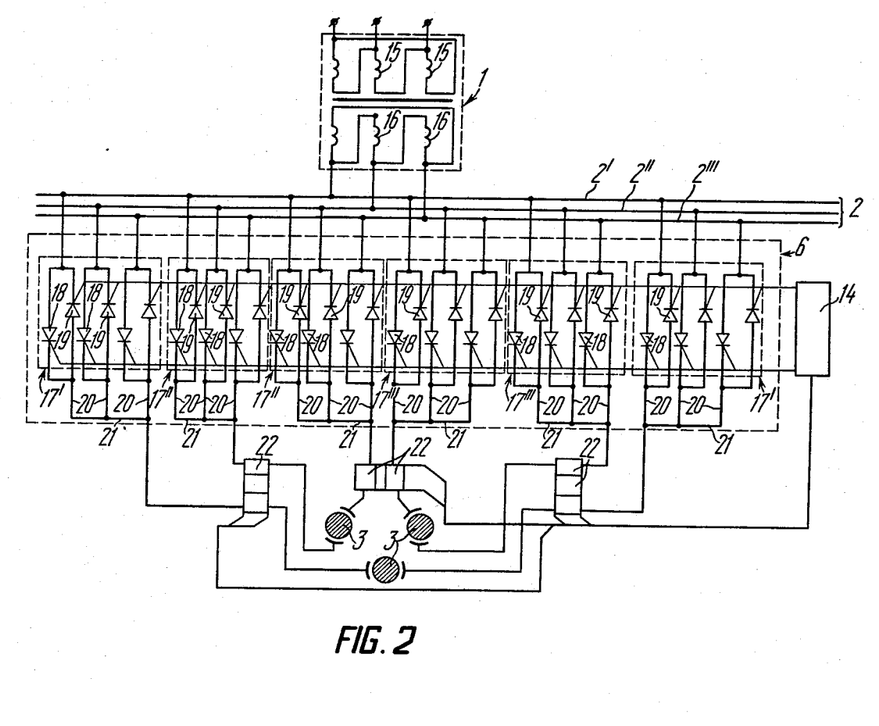
FIG. 2 is a circuit diagram of an apparatus for carrying into effect a method for smelting charge materials in an electric arc furnace, according to the invention.

FIG. 2 illustrates the circuit diagram of an apparatus for putting into effect a method for smelting charge materials, according to the invention.

It is here shown that the transformer 1 includes a primary winding 15 consisting in the case in hand of three sections coupled by their leads with a high-voltage three-phase mains (not shown on FIG. 2) and a secondary winding 16 coupled with the frequency converter 6. The number of the phases of the transformer 1 and the number of the phases of the power supply arrangements 2 are each equal to three, the first, the second and the third phases of the power supply arrangements 2 being designated by item numbers 2', 2" and 2'" respectively. The frequency converter 6 includes pairs (in the case in hand, three pairs) of identical rectifier groups 17', 17" and 17'", of which each comprises three arms of rectifiers 18 and 19 arranged in an opposing-parallel connection. Here and below the arm of the rectifiers 18, 19 is termed an element of each rectifier group 17', 17", 17'" incorporating a rectifier 18 designated arbitrarily the forward rectifier and a rectifier 19 designated arbitrarily the reversed rectifier, the two rectifiers being coupled with one of the phases 2', 2" or 2'" of the power supply arrangements 2, i.e. with one of the sections of the secondary winding 16 of the transformer 1. On one side, the arms of the rectifiers 18 and 19 of each of the rectifier groups 17', 17" and 17'" are connected by their primary leads to respectively the first 2', the second 2" and the third 2'" phases of the power supply arrangements 2 on the side of the transformer 1. The secondary leads 20 of the arms of the rectifiers 18, 19 in each group 17', 17" and 17'" are coupled with the short-circuiting buses 21. The short-circuiting buses 21 of the rectifier groups 17', 17" and 17'" belonging to one pair are isolated one from another and coupled with one and the same respective electrode 3 through the electric transducer 7 formed with, for example, shunts 22. A part of the power supply arrangements 2 on the side of the electrodes 3 is assembled of parallelly set (bifilar) conductors, for example, interleaved ones, and connected to the short-circuiting buses 21 of the adjacent rectifier groups 17' and 17", 17" and 17'", 17'" and 17' belonging to different pairs. This disposition of the conductors of the power supply arrangements 2 compensates for the magnetic field on this section thereof, so decreasing the reactive power in the secondary and the primary networks of the frequency converter 6 and, in consequence, raising the power factor.

The control unit 14 is intended for alternate switching ON and OFF of the rectifiers 18 and 19 with an adjustable interval between these operations. An apparatus formed with a circuit illustrated on FIG. 2 produces a three-phase current of a frequency ranging between 0.05 and 30 Hz with the output voltage, so as to avoid distortions in the network voltage. The apparatus illustrated on FIG. 2 has a power factor greater than that of an electric furnace supplied with industrial-frequency current.

Figure 3:
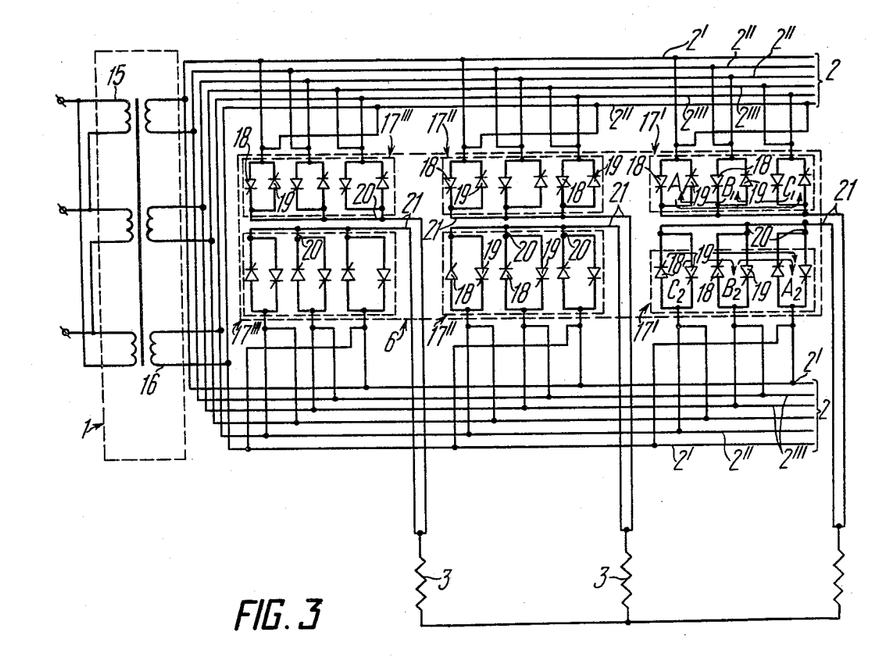
FIG. 3 is one of the embodiments of a frequency converter of an apparatus, according to the invention.

FIG. 3 shows yet another circuit of the frequency converter 6. Here, the same as on FIG. 2, the frequency converter 6 is formed with a circuit for direct frequency conversion and includes pairs of the identical rectifier groups 17', 17", 17'", of which each contains three pairs of the rectifiers 18 and 19 arranged in an opposing-parallel connection. In each of the rectifier groups 17', 17", 17'", each of the arms of the rectifiers 18 and 19 is coupled by the primary lead thereof with one of the phases 2', 2", 2'" of the power supply arrangements 2 on the side of the transformer 1. The secondary leads 20 of all the arms belonging to one of the groups 17', 17", 17'" are connected to the corresponding short-circuiting bus 21. In each pair, the rectifier groups 17', 17" and 17'" are connected electrically to one another and to the corresponding electrode 3.

Figure 4:
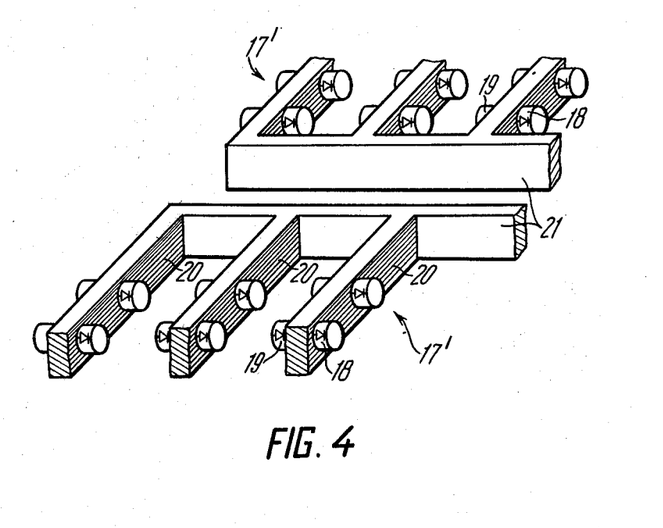
FIG. 4 is one of the embodiments of a frequency converter circuit, according to the invention.

FIG. 4 presents an embodiment of one pair of the rectifier groups, for example, the rectifier groups 17' of the first pair. The secondary leads 20 of the arms of the rectifiers 18, 19 of each rectifier group 17' are coupled with the short-circuiting bus 21. The short-circuiting buses 21 of the rectifier groups 17' belonging to one pair are placed opposite and parallel to one another to provide a bifilar arrangement. The arms of the rectifier group 17' connected by their primary leads to the first 2' (FIG. 3), the second 2" and the third 2'" phases of the power supply arrangements 2 will be hereafter termed the arm of the first, the second and the third phases respectively. Referring now to FIG. 4, let us explain in greater detail the mutual arrangement of the arms of the rectifier groups 17' belonging to one phase. The arm of the first phase of the rectifier group 17' is coaxial with the arm of the third phase of another rectifier group 17'. In the same manner, the arm of the third phase 2'" of one rectifier group 17' is coaxial with the arm of the first phase 2' of another rectifier group 17', the arms of the second phase 2" of the two rectifier groups 17' being coaxial with one another. The rectifiers 18 and 19 and the short-circuiting buses 21 in the remaining pairs of the rectifier groups 17" and 17'" (FIG. 3) are situated similarly.

Figures 5A, 5B, 5C, 5D:
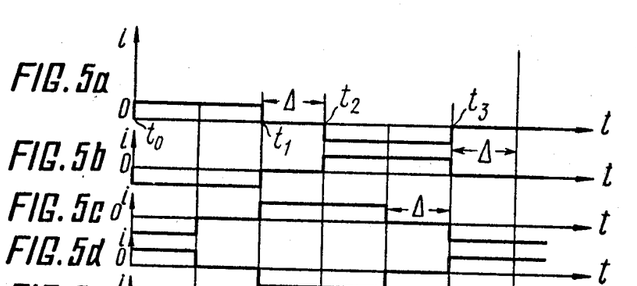
Figures 5E, 5F, 5G, 5H:
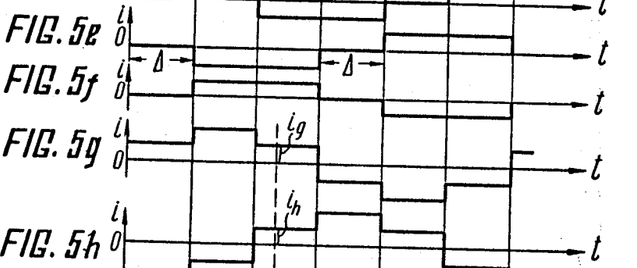
Figures 5J, 5K:
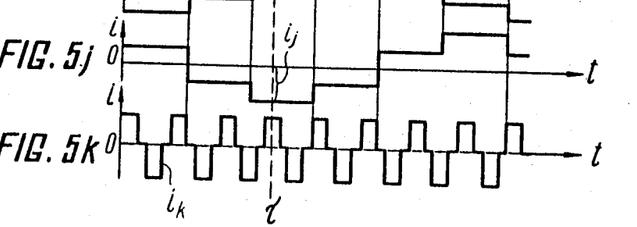

FIG. 5 shows the diagrams of instantaneous current intensities i (FIGS. 5a, 5b, 5e, 5c, 5d, 5f) in the rectifier groups 17', 17", 17'", of current intensities i (FIG. 5g, 5h and 5j) in the electrodes 3 and of mains current intensities i (FIG. 5k) through one period T of the output voltage as a function of time t.

OPERATION

The bath 4 of the electric arc furnace 5 of the apparatus shown on FIG. 1 is continuously loaded with the charge material 8 which consist of metallic and nonmetallic oxides (ores), a reducing agent and fluxing compounds. An industrial-frequency current is supplied to the power input of the frequency converter 6 through the transformer 1 and the power supply arrangements 2. A converted current of a lower frequency ranging between 0.05 and 30 Hz is fed to the electrodes 3 from the output of the frequency converter 6. This converted current flows through the charge materials 8 and the submerged thermally-insulated arc 9. The frequency converter 6 is controlled by the unit 14 which will be considered in greater detail below.

The Joule heat released in the charge materials 8 and the heat radiated by the arc 9 heat the charge materials 8 and produce high-temperature zones where the temperatures lie between 2000° and 4000° C. At these temperatures, the ore oxides volatilize and are reduced in vapour state. Furnace gases resulting from the redox reactions and consisting mostly of carbon monoxide pass through the overlying charge materials 8 and heat them.

As the charge materials 8 gradually descend, they heat, soften and melt. The main reducing reactions take place in the liquid phase, whereas a reduced melt 10 of metals and non-metals trickles into the bottom.

As the melt 10 accumulates, it is removed from the furnace bath 4 through the taphole 11.

The active electrical resistance in the zone of each electrode 3 in the bath 4 of the electrical arc furnace 5 fluctuates continuously during smelting, so that the current intensity in the electrodes 3 deviates from specified settings, this being monitored by the electric transducer 7. Signals from the electric transducer 7 enter the unit 14 which adjusts the angle of opening of the rectifiers 18, 19 of the frequency converter 6. The variation of the angle of opening of the rectifiers 18 and 19 leads to changes in the voltage and the current supplied to the electrodes 3, so adjusting the power input to the apparatus. This requires no re-positioning of the electrodes 3 and so provides a stabler distribution of thermal energy in the bath 4 (FIG. 1) of the electric arc furnace 5 and stabilizes the position of the reaction zones and, in consequence, provides a more rapid and a fuller reduction of elements contained in the ore and a higher overall efficiency of operation of the electric arc furnace 5.

Should the current intensity deviation exceed 10%, the power input adjustment unit 12 (FIG. 1) energizes to emit a signal to the positioning mechanism 13 for raising or lowering the electrodes 3 and so restoring the specified current intensity, similarly to known devices. Where the re-positioning of the electrodes fails to restore the specified power input, the voltage applied across the electrodes 3 is adjusted by changing the taps of the transformer 1.

The frequency of the voltage and the current supplied to the electrodes 3 is varied either in steps during smelting or the process is conducted at a single optimum frequency selected on the range between 0.05 and 30 Hz. A variation in the current frequency re-distributes the energy (the power input) released in the bath 4 through variation of the active and the reactive resistances of the current circuits in the bath 4, the part of the energy generated in the arc 9 increases with decreasing current frequency. The drop in current frequency also increases the power factor cos $\phi$ of the electric arc furnace 5 and of the electrical efficiency of the apparatus, this, in turn, raising the voltage across the arc 9.

The current frequency is varied in discrete steps during smelting with good electrical parameters (power factor, power utilization efficiency, small proportion of subharmonic components and other parameters) on the current frequency range between 0.05 and 30 Hz using the frequency converter 6 controlled by the unit 14 which switches ON and OFF the rectifiers 18 and 19 (FIG. 2) with an adjustable interval between these operations. For example, where a frequency converter 6 shown on FIG. 2 is employed, first a signal emitted from the output of the unit 14 switches ON the forward rectifiers 18 for a specified time, then switches them OFF. After a certain adjustable interval of time $\Delta$ (FIG. 5), signals from the output of the unit 14 (FIG. 2) switch ON the reversed rectifiers 19. The current flowing through the rectifier groups 17', 17", 17''' being naturally reverse. The interval of time $\Delta$ (FIG. 5) between the switching OFF of the rectifiers 18 (FIG. 2) and the switching ON of the rectifiers 19 is 1/6-th of the period T (FIG. 5) of the output voltage.

The operation of the frequency converter 6 (FIG. 2) can best be described using diagrams illustrated on FIG. 5. At a moment of time $t_o$ (FIG. 5a), the forward rectifiers 18 (FIG. 2) of the group 17' and the reversed rectifiers 19 of the group 17" (see diagram on FIG. 5b) are switched ON. At the moment of time $t_1$, after a period of time T/3 elapses, the rectifiers 18, 19 (FIG. 2) are switched OFF and remain so during a period of time $\Delta$ (FIG. 5) equal to 1/6-th of T. At the moment of time $t_2$, the rectifiers 19 (FIG. 2) of the rectifier groups 17' and the rectifiers 18 of the rectifier group 17" (see the diagrams on FIGS. 5a and 5b respectively) are switched ON.

At the moment of time $t_3$, after a period equal to $\frac{1}{3}$-rd of T has elapsed, the rectifiers 18, 19 (FIG. 2) are switched OFF and remain so during the interval of time $\Delta$. The process in these rectifier groups 17', 17" then repeats itself. The rectifiers 18 and 19 in the remaining rectifier groups 17" and 17''' (diagrams of FIGS. 5c, 5d) and the rectifier groups 17''' and 17' (diagrams on FIGS. 5e, 5f) are switched ON and OFF with a shift in time of $\frac{1}{3}$-rd T and $\frac{2}{3}$-rds to T relative to the above operations. The effect of this is that currents circulating in bifilar conductors of the power supply arrangements 2 (FIG. 2) are equal in intensity and opposite in direction, so that their magnetic fields balance out. The diagrams FIGS. 5g, 5h, 5j show the current intensities $i_g$, $i_h$, $i_j$ in the electrodes 3, which are the sum total of the current intensities illustrated on the diagrams of FIGS. 5a and 5f, 5b and 5c, 5d and 5e respectively. The mains current intensity $i_k$, illustrated on FIG. 5k, carries no low-frequency fluctuations due to the no-current interval, this decreasing the proportion of the subharmonic constituents in the power supply voltage and increasing the power factor of the frequency converter 6.

Consider now the operation of the frequency converter 6 shown on FIGS. 3, 4. On FIG. 3, arrows $B_1A_1$, $C_1B_1$, $A_1C_1$ and $B_2A_2$, $C_2B_2$, $A_2C_2$ indicate the directions of flow of switching currents when the arms of the first, the second and the third phases, for example, of the group 17' are switched. As seen, the directions of the switching currents in the given circuit are mutually opposite, this balancing out their magnetic fields due to the bifilar arrangement of the short-circuiting buses 21 of these groups 17', in a decreasing the cutout angle of the rectifiers 18 and 19 and raising the power factor of the frequency converter 6.

Each of the manufacturing processes effected in an electric arc furnace 5 (FIG. 1) is characterized by inherent to it regularities of the variation of the electric resistance of the charge materials 9 and the required energy for conducting the redox reactions. It thus becomes possible to operate the electric arc furnace on an alternating current having a frequency variable between 0.05 and 30 Hz or on a single frequency on this range.

For example, the best performance in the smelting of high-percentage ferrosilicon is achieved on release in the arc 9 of up to 60-90% of the energy that is supplied to the bath 4 of the electric arc furnace 5, depending on silicon content in the alloy. Thus, the conversion to the frequency of 5 Hz in the smelting of 75-% ferrosilicon raises the proportion of the energy released in the arc 9 by 15-20% and so ensures high smelting performance in the same bath 4, as in the smelting of a 45-% ferrosilicon. A change to another alloy involves no need for using different furnaces. For instance, the smelting of the 45-% ferrosilicon will require operation on a current having a frequency of 12 to 45 Hz in the same bath 4 of the electric arc furnace 5.

Therefore, the drop in the frequency, on the one hand, increases in the useful voltage across the electrodes 3, whereas, on the other hand, promotes the re-distribution of the power input in the bath 4 and decreases the proportion of the current flowing through the charge materials 8, this making possible operation on an elevated useful phase voltage without disturbing the course of the smelting process. This, in its turn, raises the electrical efficiency of the electric arc furnace 5 and the throughput capacity thereof.

This can be illustrated by that the smelting in a 16.5-MVA open electric furnace on 5-Hz current of 75-% ferrosilicon using the method and the apparatus according to the invention raises the power factor of the plant from 0.82 to 0.92, the electric efficiency, from 0.897 to 0.914, the throughput capacity, by 15%, and lowers the specific electric power consumption by 2%.

The above factors improve the performance of the existing electric furnaces and indicate ways for creating furnaces of large unit ratings and high performances.

The smelting method according to the invention makes possible the discrete variations of the current frequency and of the voltage in the course of each smelting period and, in consequence, the operation of the electric arc furnace 5 on the fixed (immovable) electrodes 3. The thermal field of the bath 4 and the positions of the zones of the charge materials 8, of the arc 9 and of the melt 10 will then remain stable and so provide improved performance (specific electric power consumption, throughput capacity and other parameters) of the process through better utilization of the power input and calendar time.

Another advantage of the above smelting method according to the invention is lower energy losses in the metallic structures of the electric arc furnace 5 and of the production shop due to currents induced by the electric field. This minimizes the heating of these metallic structures and so prevents loss in their strength, thus making a wider range of magnetic materials suitable for building the electric are furnace 8 and the production shop premises.

The low-frequency smelting method according to the invention also reduces the skin and the proximity effects, owing to which the power supply arrangements 2 and the transformer 1 can be made of a smaller amount of copper, as the cross section thereof is utilized more effectively.

The smelting of charge materials by the method according to the invention in a 24-MVA electric arc furnace 5 at the current frequency of 5 Hz raises the power factor by 1.5% and the throughput capacity of the furnace by 1.4% as compared to operation on industrial frequency.

What is claimed is:

1. In a method for smelting charge materials within a bath of an electric arc furnace with nonconsumable electrodes being provided with electric current having a direction which changes periodically, comprising the steps of:
    loading said charge materials into said bath of the electric arc furnace,
    smelting said charge materials,
    carrying out redox reactions, and
    tapping finished melt and slag;
    the improvement comprising the steps of:
    converting said electric current into a multi-phase current, having a base frequency which is within the range of 0.05 to 30 Hz,
    providing said converted electric current to said electrodes of the electric arc furnace,
    providing a stable position of said electrodes within said bath of the electric arc furnace,
    monitoring variations in the converted current and voltage at said electrodes,
    controlling the duration of a no-current condition interval between oppositely-directed half-waves of said converted current provided to said electrodes as a function of the monitored current and voltage, and said base frequency of said current, and
    controlling said base frequency of said converted current within said range of 0.05 to 30 Hz.

2. In the method of claim 1, further comprising the steps of:
    maintaining the variations in said converted current or voltage at said electrodes within predetermined limits while the stable position of said electrodes within said bath of the electric arc furnace is maintained,
    displacing said electrodes within said bath of the electric arc furnace should said variations in said current and voltage be in excess of an upper one of said predetermined limits,
    providing a transformer having voltage tappings, and
    switching over the voltage tappings of the transformer under the condition of a prolonged variation from a rated value of said current or voltage.

3. In apparatus for smelting charge materials, said apparatus comprising:
    a transformer having primary and secondary windings,
    an electric arc furnace having a bath and nonconsumable electrodes fitted therein, and arranged for loading the charge materials, smelting the charge materials, and carrying out redox reactions with respect to said charge materials,
    a current frequency converter having primary and secondary terminals, and including a control unit, and
    a current conductor arranged to connect said secondary windings of said transformer with the primary terminals of said current frequency converter, as well as to connect the secondary terminals of said current frequency converter to said electrodes;
    the improvement wherein said current frequency converter comprises a direct-converter configuration circuit provided with pairs of like-type valve groups, each said group comprising three arms comprising parallel, oppositely connected valves and having a secondary terminal, and wherein each said arm within each said group is connected with its said secondary terminal to a short-circuiting bus, said short-circuiting buses associated with said valve groups relating to a single said pair being insulated from one another and being connected to one of said electrodes of the electric arc furnace;

wherein a section of said current conductor, between said secondary terminals of the valve groups relating to different said pairs and said electrodes, comprises bifilarly positioned wires;

said section of said current conductor being made to accommodate sensors responsive to the converted current and voltage at said electrodes of the electric arc furnace;

said sensors having outputs which are brought to the input of said control unit of the converter; and control means to ensure high-power performance when the electrodes are being maintained stationary under the condition of controlling said no-current interval and frequency.

4. In the apparatus of claim 3, wherein said power control unit for the electric arc furnace is provided with a mechanism adapted to displace said electrodes, and with a voltage tapping switch of said transformer;

the input of said power control unit being coupled to the output of said sensors in said converters for the current and voltage at said electrodes.

* * * * *